(12) United States Patent
Awachat et al.

(10) Patent No.: US 11,898,790 B2
(45) Date of Patent: *Feb. 13, 2024

(54) TRIM BREAKER FOR AN INSULATED APPLIANCE

(71) Applicant: WHIRLPOOL CORPORATION, Benton Harbor, MI (US)

(72) Inventors: Abhishek S. Awachat, Pune (IN); Luca Distaso, Gemonio (IT); Andrea Gasparoni, Comerio (IT); Pushpendra Prakash Mahajan, Pune (IN); Vishal Shankar Marathe, Pune (IN); Pushkal Singh, Pune (IN); Nelson Rene Garcia-Polanco, Saragossa (ES)

(73) Assignee: Whirlpool Corporation, Benton Harbor, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/729,154

(22) Filed: Apr. 26, 2022

(65) Prior Publication Data

US 2022/0252333 A1  Aug. 11, 2022

Related U.S. Application Data

(63) Continuation of application No. 16/730,040, filed on Dec. 30, 2019, now Pat. No. 11,346,596.

(51) Int. Cl.
*F25D 23/08* (2006.01)
*F25D 23/06* (2006.01)

(52) U.S. Cl.
CPC ......... *F25D 23/085* (2013.01); *F25D 23/087* (2013.01); *F25D 23/062* (2013.01); *F25D 23/065* (2013.01); *F25D 23/082* (2013.01)

(58) Field of Classification Search
CPC ..... F25D 23/085; F25D 23/082; F25D 23/087
See application file for complete search history.

(56) References Cited

U.S. PATENT DOCUMENTS

| | | |
|---|---|---|
| 3,380,615 A | 4/1968 | Kessler |
| 4,653,819 A | 3/1987 | Swerbinsky |
| 4,732,432 A | 3/1988 | Keil et al. |
| 4,891,912 A | 1/1990 | Bockwinkel |
| 6,464,312 B1 | 10/2002 | Tenhundfelt et al. |
| 6,485,122 B2 | 11/2002 | Wolf et al. |
| 6,655,766 B2 | 12/2003 | Hodges |
| 8,943,770 B2 | 2/2015 | Sanders et al. |
| 10,563,905 B1 | 2/2020 | Allard et al. |
| 10,697,699 B2 | 6/2020 | Krishna et al. |
| 10,830,527 B2 | 11/2020 | Deka et al. |

(Continued)

FOREIGN PATENT DOCUMENTS

| | | |
|---|---|---|
| EP | 1957903 A1 | 8/2008 |
| JP | 10253242 A | 9/1998 |
| WO | 2018022007 A1 | 1/2018 |

*Primary Examiner* — Kimberley S Wright
(74) *Attorney, Agent, or Firm* — Price Heneveld LLP

(57) ABSTRACT

A trim breaker for sealing an outer wrapper of an appliance with an inner liner to form an insulation space therebetween is provided. The trim breaker includes a body including a rear wall, a first leg extending from the rear wall, and a second leg extending from the rear wall. The trim breaker also includes a front wall coupled with the body opposite the rear wall, wherein the front wall includes a channel extending inward toward the rear wall, and a chamber defined at least in part between the front wall and the rear wall.

18 Claims, 8 Drawing Sheets

(56) References Cited

U.S. PATENT DOCUMENTS

| | | |
|---|---|---|
| 10,837,697 B2 | 11/2020 | Amorim et al. |
| 10,914,511 B2 | 2/2021 | Naik et al. |
| 10,914,514 B1 | 2/2021 | Hunter et al. |
| 2002/0041134 A1 | 4/2002 | Wolf et al. |
| 2009/0007587 A1 | 1/2009 | Lanzi et al. |
| 2011/0179816 A1 | 7/2011 | Andersson et al. |
| 2016/0258671 A1 | 9/2016 | Allard et al. |
| 2019/0128591 A1 | 5/2019 | Visin et al. |
| 2019/0128593 A1 | 5/2019 | Deka et al. |
| 2019/0170431 A1 | 6/2019 | Naik et al. |
| 2020/0132359 A1 | 4/2020 | Amorim et al. |
| 2020/0141628 A1 | 7/2020 | Krishna et al. |
| 2021/0199368 A1 | 7/2021 | Awachat et al. |

US 11,898,790 B2

TRIM BREAKER FOR AN INSULATED APPLIANCE

CROSS-REFERENCE TO RELATED APPLICATION

The present application is a continuation of U.S. patent application Ser. No. 16/730,040 filed Dec. 30, 2019, entitled "TRIM BREAKER FOR AN INSULATED APPLIANCE," now U.S. Pat. No. 11,346,596, the entire disclosure of which is hereby incorporated herein by reference.

BACKGROUND OF THE DISCLOSURE

The present disclosure generally relates to a trim breaker for an insulated appliance, such as a refrigerator or freezer, and more specifically, to a polymeric trim breaker for an insulated appliance.

Increasing the insulative qualities of appliances, including refrigerating appliances such as refrigerators and freezers, is generally desirable to consumers. A conventional refrigerator typically includes an outer wrapper sealed with an inner liner by a trim breaker. The space between the outer wrapper and the inner liner can be filled with an insulation material to insulate an interior of the appliance. One approach for insulating the space between the outer wrapper and the inner liner includes providing an insulation material within the space, sealing the space, and then drawing a vacuum to provide a vacuum-insulated structure.

SUMMARY OF THE DISCLOSURE

According to one aspect of the present disclosure, a trim breaker for sealing an outer wrapper of an appliance with an inner liner to form an insulation space therebetween is provided. The trim breaker includes a body including a rear wall, a first leg extending from the rear wall, and a second leg extending from the rear wall. The trim breaker also includes a front wall coupled with the body opposite the rear wall, wherein the front wall includes a channel extending inward toward the rear wall, and a chamber defined at least in part between the front wall and the rear wall.

According to another aspect of the present disclosure, an appliance includes an outer wrapper having a plurality of joined walls and an outer wrapper edge and an inner liner spaced from the outer wrapper and including a plurality of joined walls and an inner liner edge. The appliance also includes a trim breaker having a body including a rear wall, a first leg extending from the rear wall and coupled with the outer wrapper edge, and a second leg extending from the rear wall and coupled with the inner liner edge. The trim breaker also includes a front wall coupled with the body opposite the rear wall and a chamber defined at least in part between the front wall and the rear wall. The rear wall includes a first portion connected with a second portion that is offset toward the front wall relative to the first portion. The trim breaker seals the outer wrapper with the inner liner to form an insulation space between the outer wrapper and the inner liner.

According to another aspect of the present disclosure, an appliance includes an outer wrapper including a plurality of joined walls and an outer wrapper edge, an inner liner spaced from the outer wrapper and including a plurality of joined walls and an inner liner edge, and trim breaker. The trim breaker includes a body including a rear wall, a first leg extending from the rear wall and coupled with the outer wrapper edge, and a second leg extending from the rear wall and coupled with the inner liner edge. The trim breaker also includes a front wall coupled with the body opposite the rear wall, wherein the front wall includes a channel extending inward toward the rear wall and a chamber defined at least in part between the front wall and the rear wall. The trim breaker seals the outer wrapper with the inner liner to form an insulation space between the outer wrapper and the inner liner.

These and other features, advantages, and objects of the present disclosure will be further understood and appreciated by those skilled in the art by reference to the following specification, claims, and appended drawings.

Figure 1:
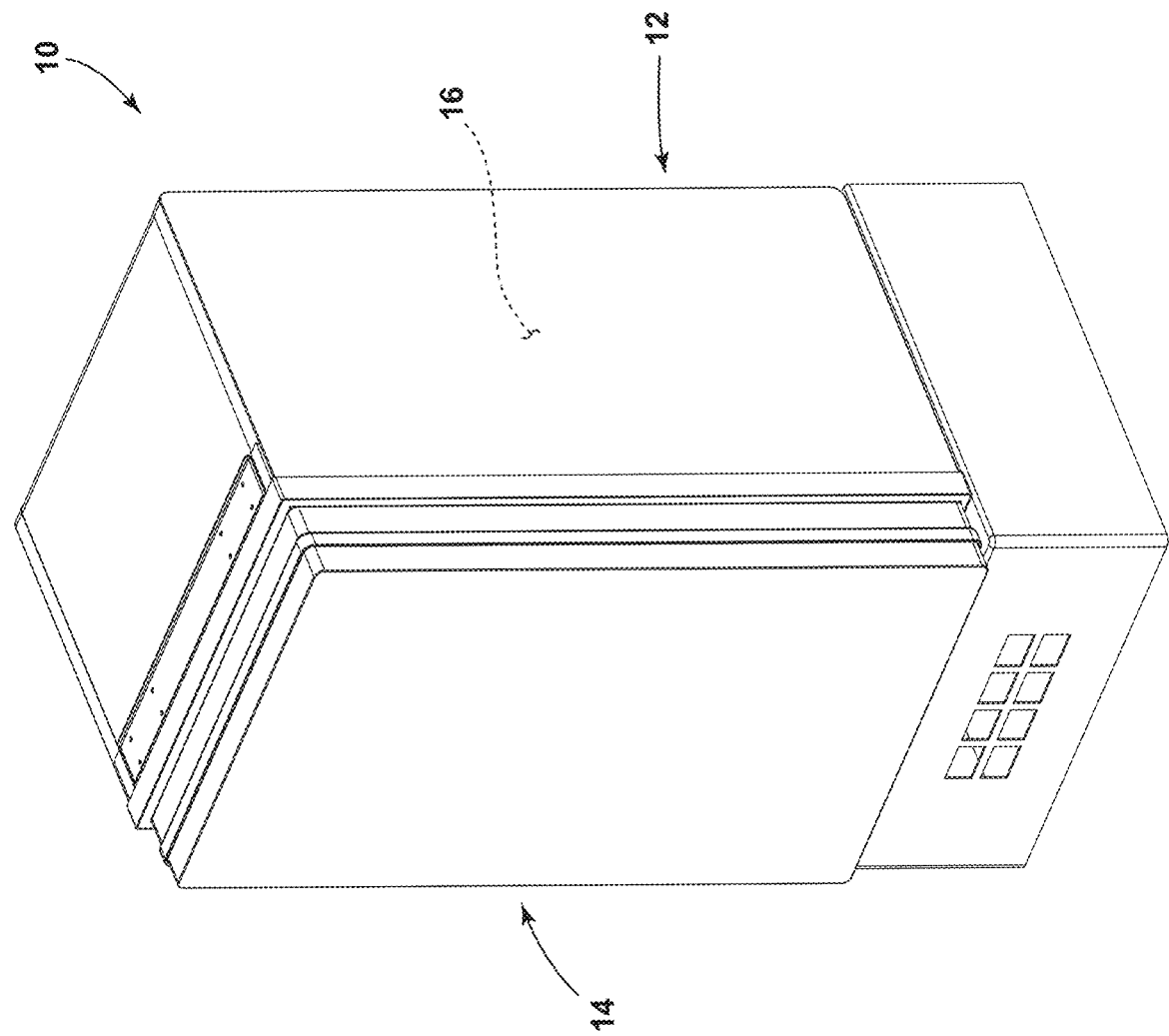
FIG. 1 is a perspective view of an insulated appliance in the form of a refrigerator, according to an aspect of the present disclosure.

The components in the figures are not necessarily to scale, emphasis instead being placed upon illustrating the principles described herein.

DETAILED DESCRIPTION

The present illustrated embodiments reside primarily in combinations apparatus components relating to a trim breaker for an insulated appliance. Accordingly, the apparatus components have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein, the terms "upper," "lower," "right," "left," "rear," "front," "vertical," "horizontal," and derivatives thereof shall relate to the disclosure as oriented in FIG. 1. Unless stated otherwise, the term "front" shall refer to the surface of the element closer to an intended viewer, and the term "rear" shall refer to the surface of the element further from the intended viewer. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a . . . " does not, without more constraints, preclude the existence of additional identical elements in the process, method, article, or apparatus that comprises the element.

Aspects of the present disclosure relate to a trim breaker for an insulative appliance, such as a refrigerating appliance, examples of which include refrigerators and freezers. A conventional refrigerating appliance typically includes an outer wrapper sealed with an inner liner by a trim breaker to define a cabinet structure. The space between the outer wrapper and the inner liner can be filled with an insulation material to insulate an interior of the appliance. In operation, there is generally a temperature differential between the interior and the exterior of the appliance, which can result in an undesirable transfer of thermal energy between the interior and exterior of the appliance. The transfer of thermal energy may result in an energy loss of the appliance, which may increase the energy consumption of the appliance.

The trim breaker of the present disclosure is configured to interrupt a heat path by which thermal energy may transfer between the interior and exterior of the appliance. In this manner, the trim breaker of the present disclosure may decrease an energy loss of the appliance. The trim breaker of the present disclosure can also be configured to have sufficient strength to withstand vacuum pressures (i.e., pressures less than ambient) within the insulation space between the outer wrapper and the inner liner, and thus can be used to form a vacuum insulated appliance.

Figure 2:
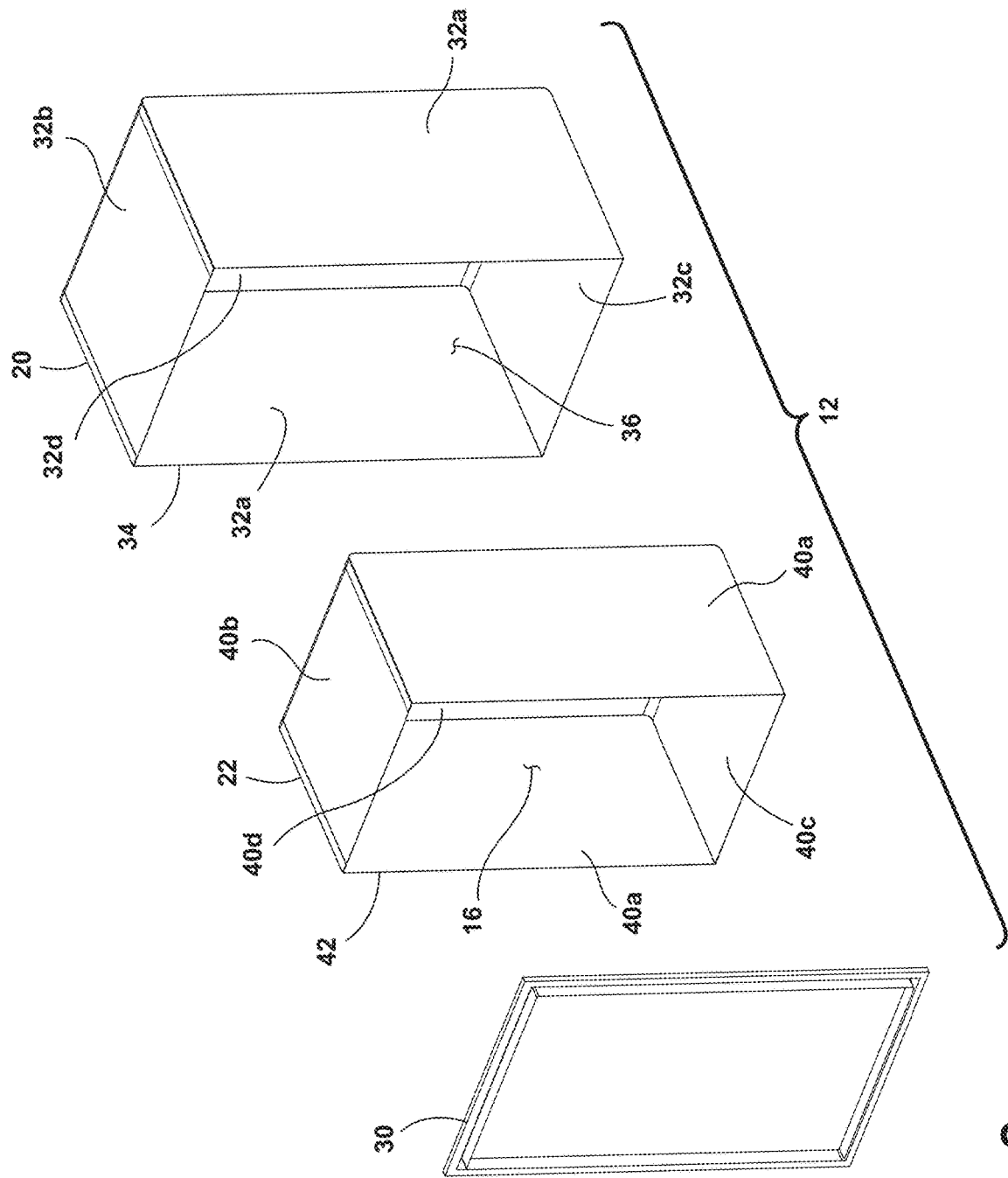
FIG. 2 is a partially exploded view of a cabinet structure of the insulated appliance of FIG. 1, according to an aspect of the present disclosure.

Referring to FIGS. 1-2, reference numeral 10 generally designates an insulated appliance in the form of a refrigerator. While the insulated appliance 10 is illustrated and described in the context of a refrigerator, it is within the scope of the present disclosure for the embodiments described herein to be used with any suitable insulated appliance, non-limiting examples of which include refrigerators, freezers, and walk-in coolers. The refrigerator 10 can include a cabinet structure 12 and a door assembly 14 that is selectively moveable between closed (FIG. 1) and open positions (not shown) to provide access to an interior 16 of the refrigerator 10. The refrigerator 10 can include additional components, such as handles, displays, user interfaces, compressors, blowers, lights, etc. that may be found in a conventional refrigerator 10, but which are not explicitly shown for the sake of brevity.

Figure 3A:
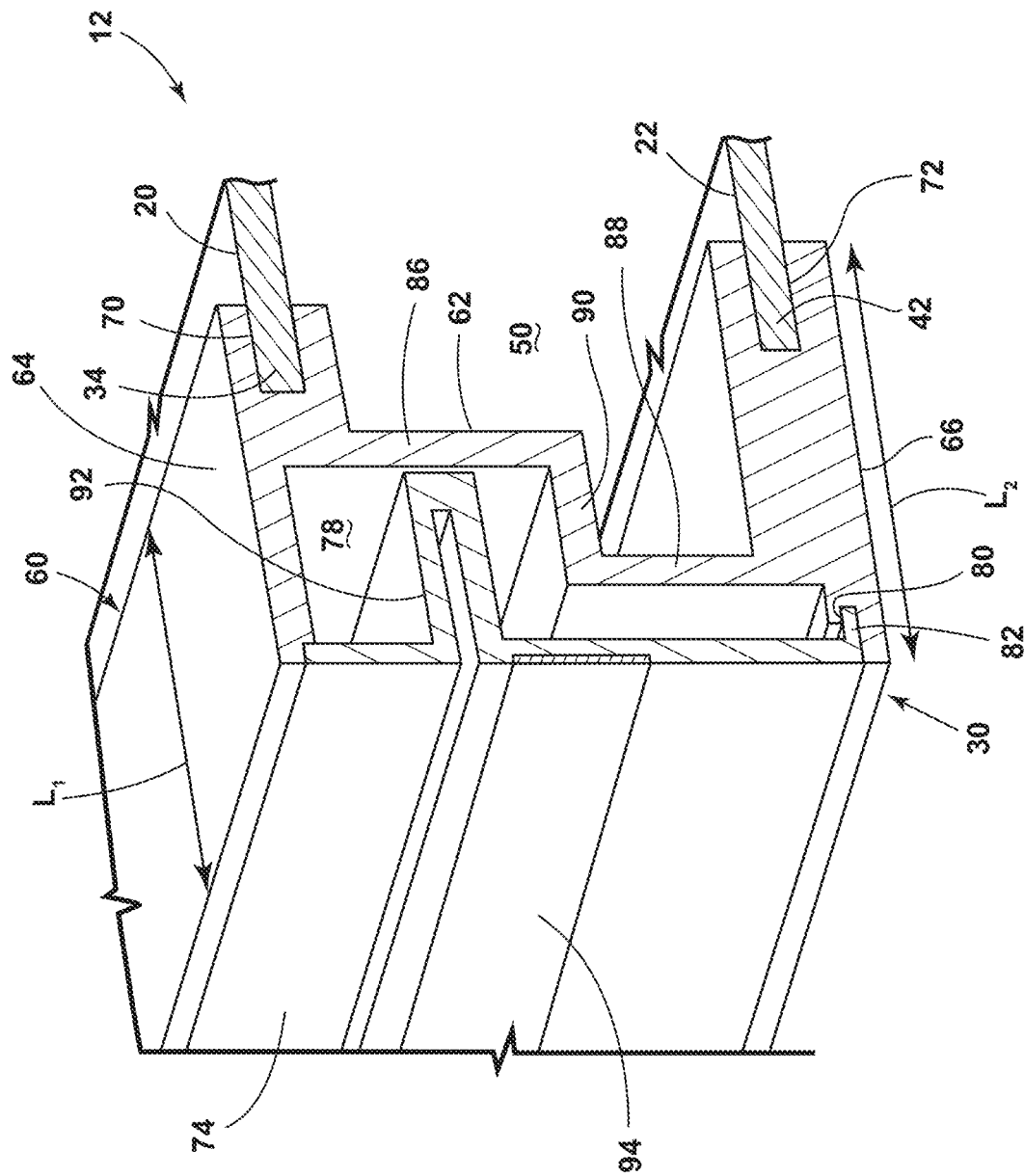
FIG. 3A is a cross-sectional perspective view of a trim breaker, according to an aspect of the present disclosure.

Referring now to FIGS. 2 and 3A, the cabinet structure 12 includes an outer wrapper 20, an inner liner 22, and a trim breaker 30. The outer wrapper 20 includes side, top, bottom, and rear walls 32a-d and an outer wrapper edge 34, which defines an opening into an interior 36 of the outer wrapper 20. The inner liner 22 includes side, top, bottom, and rear walls 40a-d and an inner liner edge 42, which partially defines an opening into the interior 16.

The side, top, bottom, and rear walls 32a-d of the outer wrapper 20 can be made from any suitable material, examples of which include metals (e.g., aluminum), metal alloys (e.g., steel, stainless steel, carbon steel, aluminum alloys), polymeric materials, or combinations thereof. One or more of the side, top, bottom, and rear walls 32a-d may be cast or molded together as a unit or may be formed separately and coupled with the other walls 32a-d in any suitable manner. In one example, one or more of the side, top, bottom, and rear walls 32a-d can be coupled using a weld. The side, top, bottom, and rear walls 40a-d of the inner liner 22 can be made from any suitable material, similar to those described for use with the outer wrapper 20. One or more of the side, top, bottom, and rear walls 40a-d of the inner liner 22 may be cast or molded together as a unit or may be formed separately and coupled with the other walls 40a-d in any suitable manner. In one example, one or more of the side, top, bottom, and rear walls 40a-d can be coupled using a weld.

Still referring to FIGS. 2 and 3A, the trim breaker 30 is configured to couple with the outer wrapper 20 and the inner liner 22 to seal an insulation space 50 formed in the space between the walls 32a-d of the outer wrapper 20 and the walls 40a-d of the inner liner 22, when the inner liner 22 is assembled with the outer wrapper 20. An insulation material can be provided in the insulation space 50 to decrease thermal conductivity between the interior 16 and the exterior of the refrigerator 10. In one example, a pressure in the insulation space 50 may be less than atmospheric pressure, i.e., less than about 101.3 kilopascals (kPa), to provide a vacuum insulated structure. Forming a vacuum in the insulation space 50 can decrease an amount of gas (e.g., air) present in the insulation space 50, which can decrease thermal conductivity through the insulation space 50. In one example, the pressure in the insulation space 50 can be less than about 101.3 kPa, less than about 81 kPa, less than about 61 kPa, less than about 41 kPa, less than about 31 kPa, less than about 20 kPa, or less than about 10 kPa.

In one embodiment, the outer wrapper 20 is made from a metal or metal-alloy material and the inner liner 22 is made from a polymeric material. In another embodiment, both the outer wrapper 20 and the inner liner 22 are made from a metal or metal-alloy material. In this embodiment, the metal or metal-alloy material of the outer wrapper 20 may be the same as or different than the metal or metal-alloy material of the inner liner 22. In one embodiment, the outer wrapper 20 and the inner liner 22 are made from a metal or metal-alloy material and sealed together under vacuum to form a vacuum insulated structure.

Referring to FIG. 3A, the trim breaker 30 includes a body 60 having a rear wall 62, a first leg 64, and a second leg 66. The first leg 64 can include a channel 70 configured to couple with the outer wrapper edge 34 and the second leg 66 can include a channel 72 configured to couple with the inner liner edge 42. The first leg 64 is coupled with the outer wrapper 20, and therefore may also be referred to as the exterior or outer leg 64. The second leg 66 is coupled with the inner liner 22, and therefore may also be referred to as the interior or inner leg 66. The first leg 64 and second leg 66 can be coupled within the respective channels 70, 72 with an adhesive and/or weld. Optionally, the outer wrapper edge 34 and/or the inner liner edge 42 and/or the corresponding channels 70 and 72, respectively, can be shaped to facilitate coupling the trim breaker 30 with the outer wrapper 20 and inner liner 22. In one aspect, the first and second legs 64 and 66 are coupled with the outer wrapper edge 34 and the inner liner edge 42, respectively, in any manner suitable to form an air-tight seal such that the outer wrapper 20 and inner liner 22 can form a vacuum insulated structure.

The trim breaker 30 also includes a front wall 74 coupled with the body 60 and spaced from the rear wall 62 to at least partially define a chamber 78 between the rear wall 62 and the front wall 74. The front wall 74 can be coupled with the body 60 using any suitable mechanical and/or non-mechanical fastener, non-limiting examples of which include adhesives, welds, a snap-fit mechanism, an interference fit mechanism, and combinations thereof. In the example illustrated in FIG. 3A, the body 60 can include a notch 80 that is configured to receive a finger 82 projecting from the front wall 74. Optionally, the notch 80 can have dimensions that are slightly smaller than the dimensions of the finger 82 such that the finger 82 fits within the notch 80 through an interference fit. An adhesive or weld may be provided for retaining the finger 82 within the notch 80, alone or in combination with an interference fit. The configuration of notch 80 and finger 82 may be used to couple just one side of the front wall 74 with the body 60 (shown) or both sides (not shown).

Still referring to FIG. 3A, the rear wall 62 can include a first portion 86 disposed adjacent to the first leg 64 and a second portion 88 disposed adjacent to the second leg 66 and coupled with the first portion 86 by a third portion 90. The second portion 88 can be offset toward the front wall 74 relative to the first portion 86. A length of the third portion 90 can determine an amount of offset of the second portion 88. The offset of the second portion 88 relative to the first portion 86 results in a portion of the chamber 78 disposed between the second portion 88 and the front wall 74 having less depth than a portion of the chamber 78 disposed between the first portion 86 and the front wall 74.

The first leg 64 can have a length L1 that is different than a length L2 of the second leg 66. The length of each of the first and second legs 64 and 66 is measured as a distance between the front wall 74 and a distal end of the respective leg 64, 66. In one embodiment, the length L2 of the second leg 66 can be greater than a length L1 of the first leg 64 (shown). Optionally, the length L1 of the first leg 64 can be longer than the length L2 of the second leg 66 (not shown) or the same (FIG. 3C).

The front wall 74 can include a channel 92 extending into the chamber 78 toward the rear wall 62. The channel 92 can extend into the chamber 78 in the portion of the chamber 78 adjacent to the first portion 86 of the rear wall 60. The front wall 74 can optionally include a magnetic component 94 (e.g., metal strip or bar) that is configured to magnetically couple with a gasket carried by the door assembly 14 to facilitate maintaining the door assembly 14 in the closed condition. The magnetic component 94 can be coupled with the front wall 74 in any suitable manner. In one example, the magnetic component 94 is coupled with the front wall 74 by an adhesive or a weld. In another example, the front wall 74 can include a groove configured to receive the magnetic component 94 therein, optionally, through an interference fit. In another example, the magnetic component 94 can be integrally molded with the front wall 74.

The body 60 and front wall 74 can be made from the same or different materials. In one embodiment, the body 60 and/or front wall 74 are made from a thermally insulating material, examples of which include polymeric materials and ceramic materials. In one example, the body 60 is made from a polymeric material and the front wall 74 is made from a polymeric material that can be the same or different than the polymeric material of the body 60. An example of a suitable material for forming the body 60 and/or front wall 74 of the trim breaker 30 includes a polyvinyl chloride (PVC) polyester, such as a PVC polyester class 10. In some examples the polymeric material can include one or more fillers, e.g. mica. For example, the body 60 and/or front wall 74 of the trim breaker 30 can be made from a PVC polyester class 10, filled with about 10 percent by weight of a mica filler.

Figure 3B:
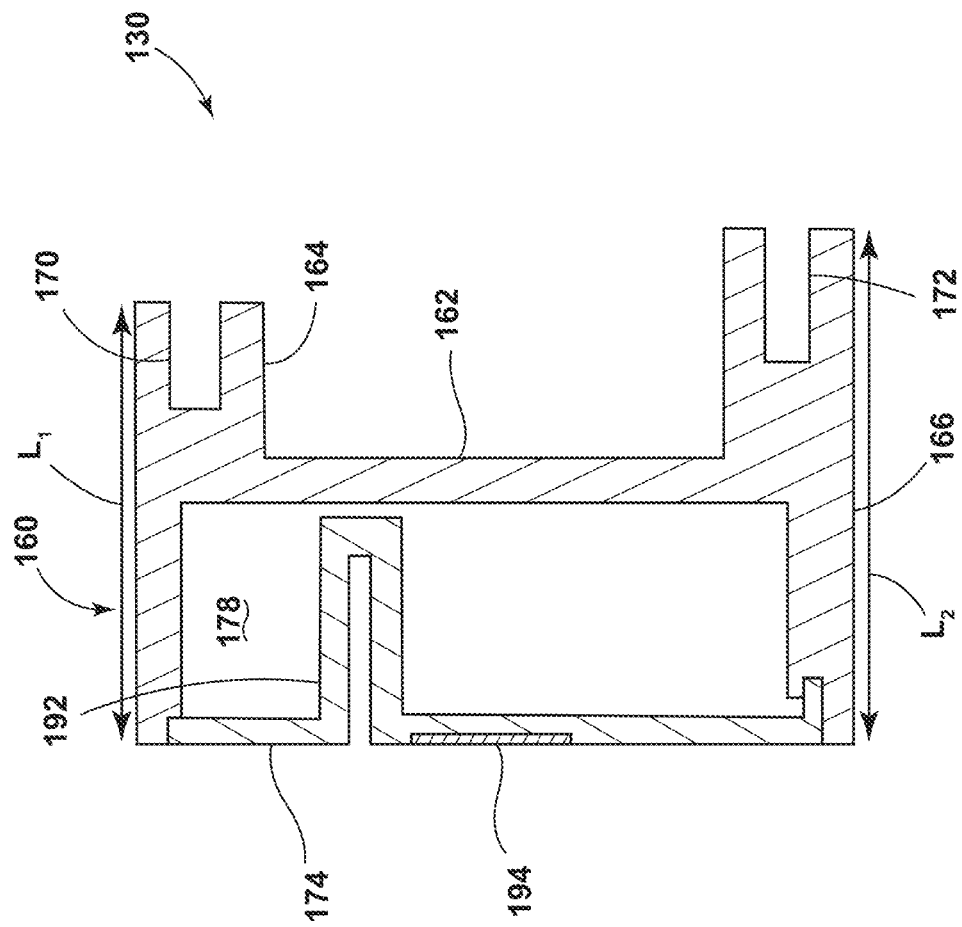
FIG. 3B is a cross-sectional view of a trim breaker, according to an aspect of the present disclosure.
Figure 3C:
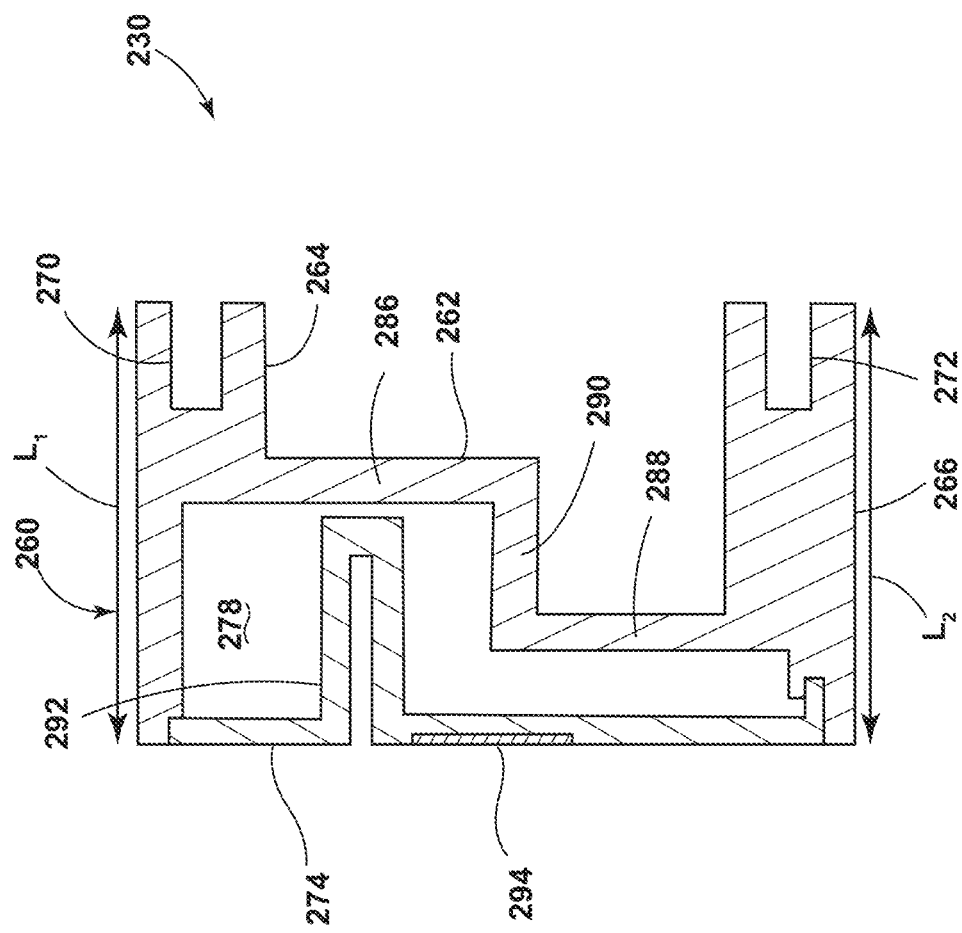
FIG. 3C is a cross-sectional view of a trim breaker, according to an aspect of the present disclosure.

FIGS. 3B and 3C illustrate additional embodiments of the trim breaker of the present disclosure which include some components that are similar to the trim breaker 30 of FIG. 3A and some components that are different. Elements of the trim breaker 130 of FIG. 3B that are similar to those of the trim breaker 30 of FIG. 3A are labeled with the prefix 100. Elements of the trim breaker 230 of FIG. 3C that are similar to those of the trim breaker 30 of FIG. 3A are labeled with the prefix 200. In the exemplary embodiment of FIG. 3B, the trim breaker 130 is similar to the trim breaker 30 of FIG. 3A except that the trim breaker 130 does not include an offset rear wall portion. As illustrated in FIG. 3B, the trim breaker 130 can include a rear wall 162 that does not include the offset second portion 88 of the rear wall 62 of the trim breaker 30 of FIG. 3A. The trim breaker 230 of FIG. 3C is similar to the trim breaker 30 of FIG. 3A except that the trim breaker 230 includes first and second legs 264 and 266, respectively, having the same length.

Without intending to be limited by any theory, the trim breakers 30, 130, 230 of the present disclosure include several features that are believed to contribute to decreasing the transfer of thermal energy between the interior 16 of the refrigerator 10 and the exterior. For example, the channel 92, 192, 292 is believed to provide the front wall 74, 174, 274 with an increased surface area that may facilitate isolating interior and exterior temperature differences at a sealing interface with the door assembly 14 and/or may inhibit the convection of gas (e.g., air) currents within the chamber 78, 178, 278. In this manner, the channel 92, 192, 292 may facilitate decreasing the likelihood of condensation forming on the front wall 74, 174, 274 and/or decrease thermal energy transfer across the trim breaker 30, 130, 230. The offset second portion 88, 288 of the rear wall 62, 262 can provide an increase in a volume of the insulation space 50, 252 compared to the trim breaker 130 of FIG. 3B, which has a rear wall 162 that does not include an offset portion. The increase in volume of the insulation space 50, 252 may allow for an increase in the amount of insulation that can be provided in the insulation space, which can contribute to decreasing the transfer of thermal energy between the interior 16 of the refrigerator 10 and the exterior.

Further, it has been found that increasing a length L2 of the second, inner leg 66, 166, which couples with the inner liner 22, 122, can also contribute to decreasing the transfer of thermal energy between the interior 16 of the refrigerator 10 and the exterior. However, as the length L2 of the second, inner leg 66, 166 increases, a structural strength of the second leg 66, 166 may be affected. In some aspects of the present disclosure, the length L2 of the second, inner leg 66, 166 can be selected based on considering a desired thermal characteristic of the trim breaker, optionally in combination with considering a desired structural strength.

Figure 4A:
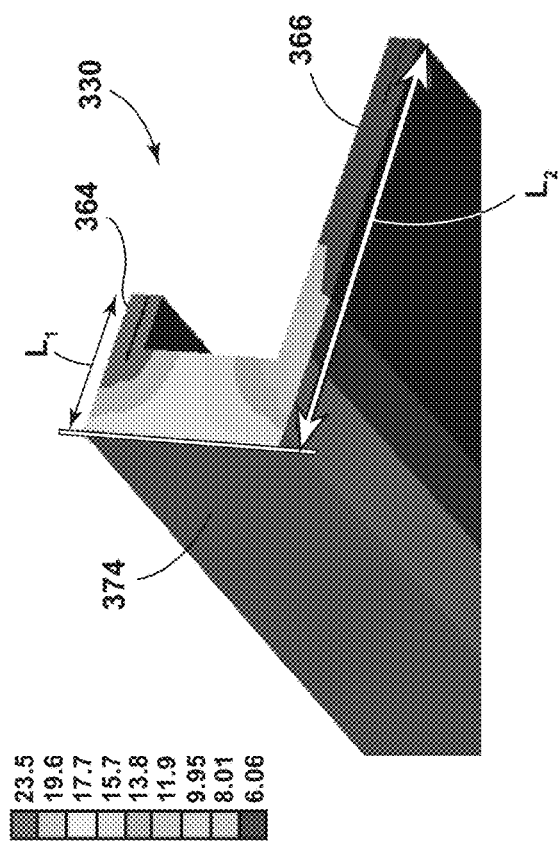
FIG. 4A is a schematic view of a simulated thermal profile of a trim breaker, according to an aspect of the present disclosure.
Figure 4B:
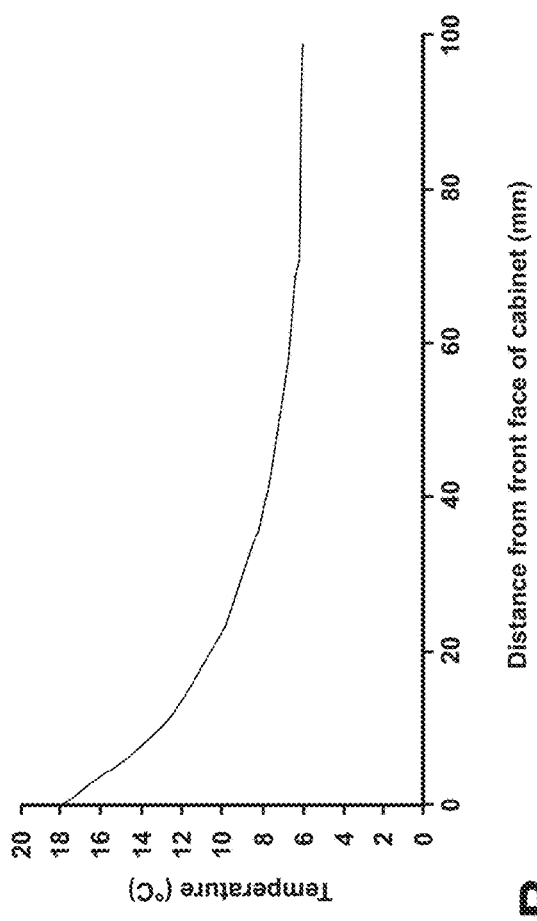
FIG. 4B is a plot of a simulated thermal profile of a trim breaker, according to an aspect of the present disclosure.

FIGS. 4A-4B illustrate simulated thermal profile data for a simulated version of the trim breaker 30 of FIG. 3A (labeled 330). Heat transfer was evaluated using steady state thermal simulations in Ansys 19.2 and using computational fluid dynamics in Altair AcuSolve. The temperature in the interior was set at 8 oC for the simulations. FIG. 4A shows a simulated trim breaker 330 in which thermal diffusion through the trim breaker 330 is illustrated using shading. FIG. 4B is a plot of a temperature as a function of distance from the front wall 374 of the simulated trim breaker 330 along the second, inner leg 366.

As demonstrated by the plot in FIG. 4B, the temperature drops rapidly for about the first 20 mm to 30 mm and then begins to level off around 40 mm. This data can be used to select a length L2 of the second, inner leg 66, 166 that balances the heat transfer characteristics of the trim breaker with the structural requirements of the trim breaker. For example, the data in FIGS. 4A-4B suggest that a leg length L2 greater than about 40 mm may provide a decrease in thermal diffusion that is not sufficient in some applications to balance the impact on structural strength of the leg at these longer lengths. In this manner, the thermal profile of the trim breaker can be used to balance heat transfer and structural considerations in determining a length of the second inner leg 66, 166. The length of the first, outer leg 64, 164 can be determined in a similar manner or based on other considerations, such as structural considerations. It is understood that aspects of the trim breaker, such as the shape, dimensions, and/or materials, and aspects of the appliance, such as temperature, can affect the thermal diffusion through the trim breaker and that the data in FIGS. 4A-B are provided for the purposes of discussion and not meant to be limiting in any manner.

FIG. 3A illustrates an embodiment of the trim breaker 30 that includes several features the affect the thermal characteristics of the trim breaker 30, such as the front wall channel 92, the offset portion 88 of rear wall 62, and longer second leg length L2. It is understood that each of these features can be used alone or in any sub-combination to form additional trim breaker embodiments within the scope of the present disclosure. Thus, while utilizing all of these features, optionally, in combination with other features, may provide the trim breaker 30 with the desired thermal characteristics, in some applications one of these features or a combination of some of these features may be sufficient to provide the desired thermal characteristics. For example, FIG. 3B illustrates an embodiment in which the front wall channel 192 and longer second leg 166 are present and the offset portion 88 of rear wall 62 of FIG. 3A is not present. In another embodiment, the trim breaker 130 of FIG. 3B may be configured without the channel 192. FIG. 3C illustrates an embodiment in which the front wall channel 292 and the offset portion 288 are present and the second leg 266 is not longer than the first leg 264. In another embodiment, the trim breaker 230 of FIG. 3C may be configured without the channel 292.

Figure 5:
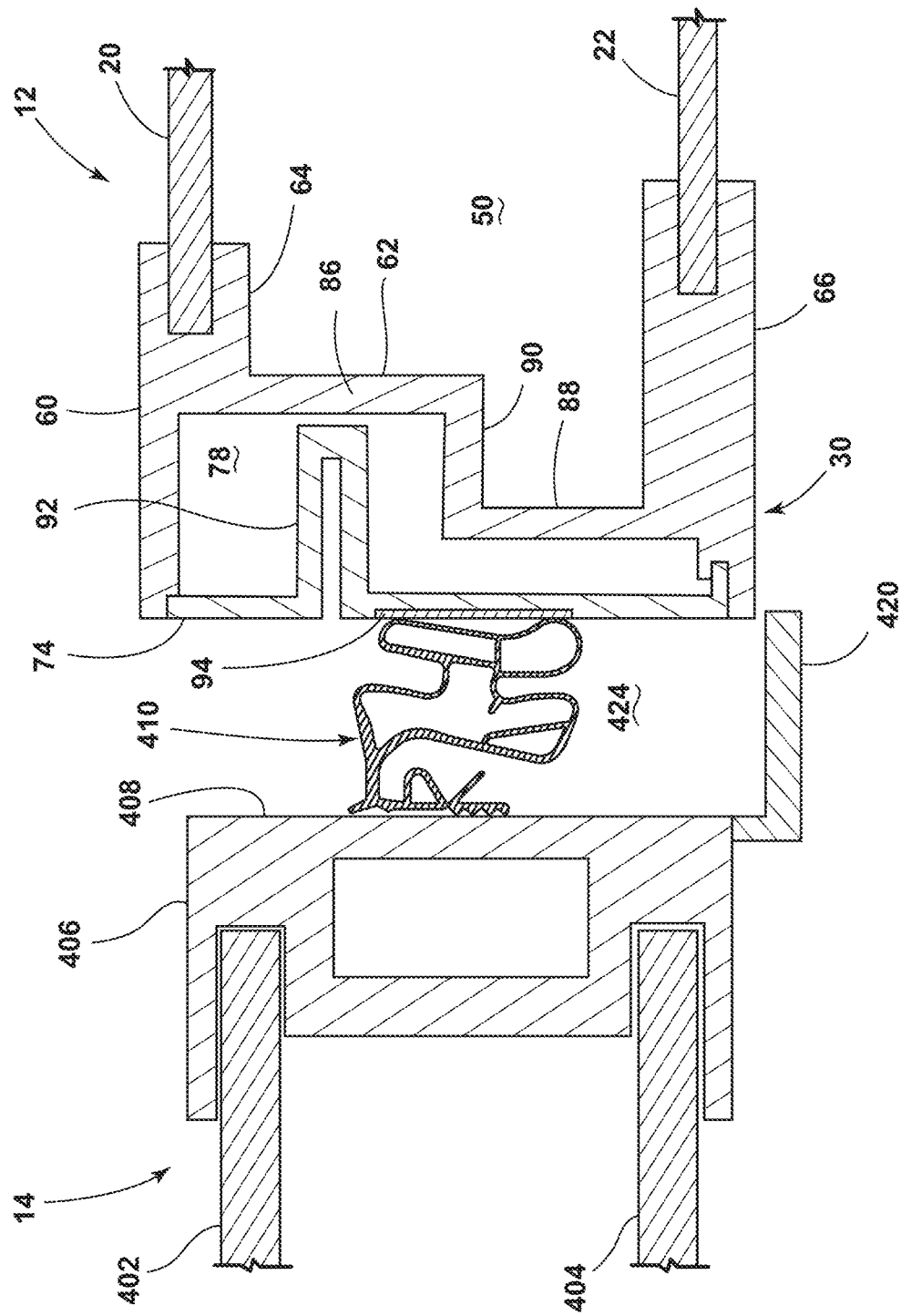
FIG. 5 is a cross-sectional view of a portion of a door assembly in a closed position and a cabinet structure, according to an aspect of the present disclosure.

FIG. 5 illustrates the cabinet structure 12 having the trim breaker 30 of FIG. 3A in use with the door assembly 14. While the cabinet structure 12 and door assembly 14 are discussed in the context of the trim breaker 30 of FIG. 3A, it is understood that any of the trim breakers described herein (e.g., trim breakers 130 and 230 of FIGS. 3B and 3C) may be used with the cabinet structure 12 and door assembly 14 in a similar manner.

The door assembly 14 can be any suitable insulated, vacuum insulated, or uninsulated door assembly capable of closing the opening to the interior 16 of the refrigerator 10. In the example of FIG. 5, the door assembly 14 includes a door inner liner 402 and a door outer wrapper 404 coupled with a door trim breaker 406. A front wall 408 of the door trim breaker 406 carries a gasket 410 that is configured to seal with the trim breaker 30 when the door assembly 14 is closed. The gasket 410 can be any suitable gasket including a magnetic component that is capable of magnetically sealing with the magnetic component 94 of the trim breaker 30. Optionally, the door trim breaker 406 can include a rib 420 that extends toward the trim breaker 30 to provide a barrier between the gasket 410 and the interior 16 of the refrigerator 10.

According to one aspect of the present disclosure, the channel 92, magnetic component 94, and gasket 410 are configured such that the gasket 410 seals with the front wall 74 of the trim breaker 30 in an area between the channel 92 and the second, inner leg 66. In one aspect of the present disclosure, the components are configured such that the gasket 410 seals with the front wall 74 between the channel 92 and the area where the front wall 74 couples with the second, inner leg 66. Without intending to be limited by any theory, is it believe that this configuration reduces thermal conduction between the gasket 410 and the second, inner leg 66, which could affect the thermal insulation capacity of the trim breaker 30. In another aspect, the components are configured such that the gasket 410 seals with the magnetic component 94 adjacent to the channel 92. Without intending to be limited by any theory, it is believed that positioning the channel 92 and the gasket 410 adjacent to one another, with the channel 92 disposed exteriorly relative to the gasket 410 when the door assembly 14 is closed, can facilitate decreasing the likelihood that external condensation forms on the trim breaker 30. The optional rib 420 can also contribute to decreasing the likelihood of external condensation by providing at least a partial barrier between gasket 410 and the refrigerated atmosphere in the interior 16 of the refrigerator 10.

Figure 6:
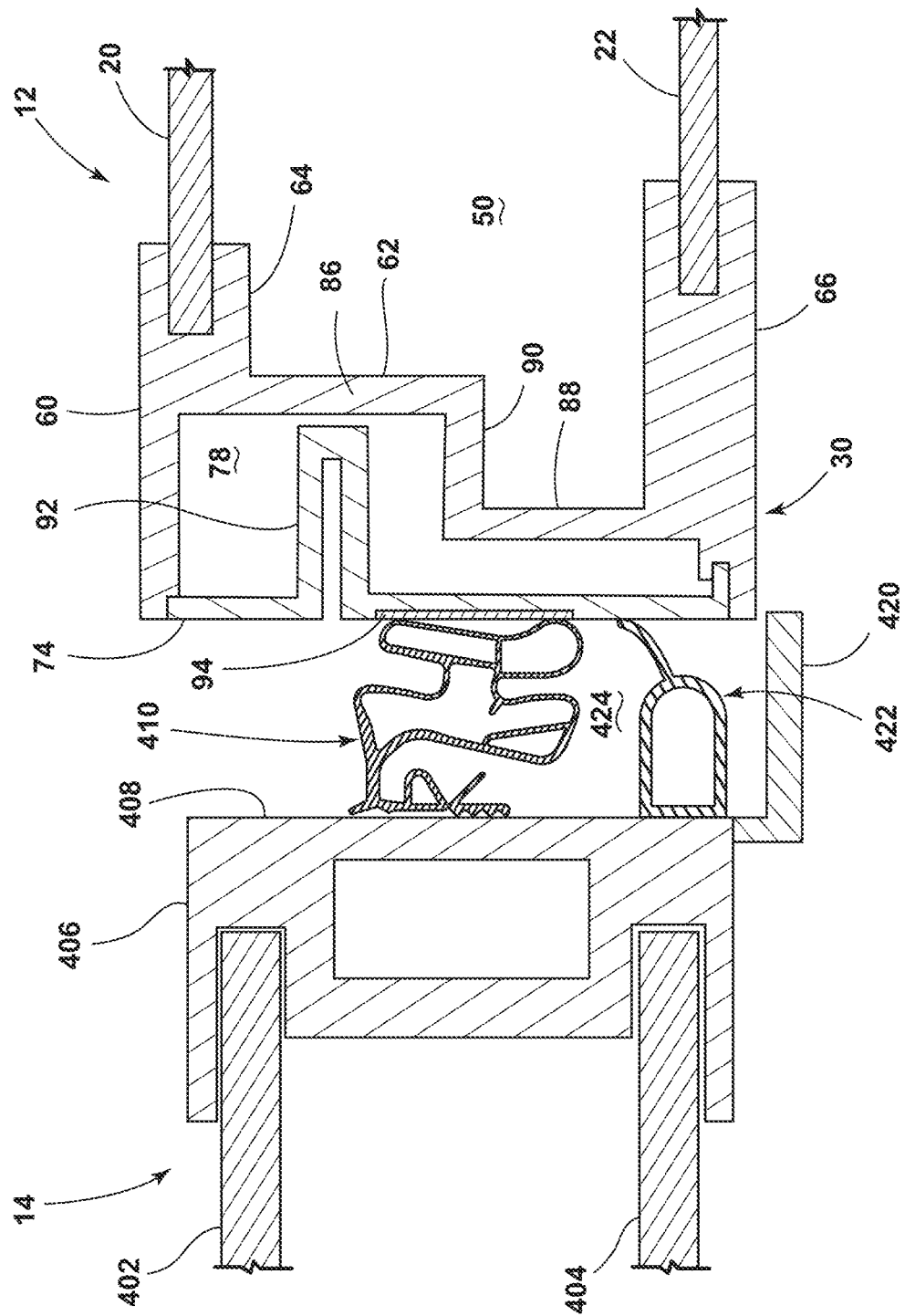
FIG. 6 is a cross-sectional view of a portion of a door assembly having a primary and a secondary gasket in a closed position and a cabinet structure, according to an aspect of the present disclosure.

Optionally, as illustrated in FIG. 6, the door assembly 14 can include a secondary gasket 422 disposed on the door trim breaker 406 such that when the door assembly 14 is closed, the secondary gasket 422 provides a barrier between the gasket 410 and the interior 16 of the refrigerator. In one example, the secondary gasket 422 can optionally be spaced from the gasket 410 to provide an air gap 424 between the gasket 410 and the secondary gasket 422. Such an air gap between the gasket 410 and secondary gasket 422 may decrease thermal conduction between the gaskets 410 and 422. The secondary gasket 422 can be used alone or in combination with the rib 420 (shown). The combination of the secondary gasket 422, the gasket 410, and the optional rib 420, can facilitate decreasing the likelihood that external condensation forms on the trim breaker 30.

Additional, non-limiting aspects of the present disclosure include:

According to a first aspect of the present disclosure, an appliance includes: an outer wrapper including a plurality of joined walls and an outer wrapper edge; an inner liner spaced from the outer wrapper and including a plurality of joined walls and an inner liner edge; and a trim breaker comprising: a body including a rear wall, a first leg extending from the rear wall and coupled with the outer wrapper edge, and a second leg extending from the rear wall and coupled with the inner liner edge; and a front wall coupled with the body opposite the rear wall; and a chamber defined at least in part between the front wall and the rear wall; wherein the rear wall includes a first portion connected with a second portion that is offset toward the front wall relative to the first portion; and wherein the trim breaker seals the outer wrapper with the inner liner to form an insulation space between the outer wrapper and the inner liner.

According to a second aspect of the present disclosure, the appliance of the first aspect, wherein the body and the front wall comprise a polymeric material.

According to a third aspect of the present disclosure, the appliance of the first aspect, wherein a length of the second leg is greater than a length of the first leg, as measured from the front wall to a distal end of each leg.

According to a fourth aspect of the present disclosure, the appliance of the first aspect, wherein the front wall includes a channel extending inward toward the first portion of the rear wall.

According to a fifth aspect of the present disclosure, the appliance of the fourth aspect, wherein the front wall includes a recess configured to receive a metal component therein, and wherein the metal component is disposed in the front wall between the channel and the second leg.

According to a sixth aspect of the present disclosure, the appliance of the first aspect, further comprising a door including a first gasket configured to form a seal with the front wall when the door is in a closed position and a second gasket disposed adjacent to the first gasket such that the second gasket is between the first gasket and an interior of the appliance when the door is in the closed position.

According to a seventh aspect of the present disclosure, the appliance of the first aspect, further comprising an insulation material sealed within the insulation space at a pressure below ambient pressure.

According to an eighth aspect of the present disclosure, an appliance includes: an outer wrapper including a plurality of joined walls and an outer wrapper edge; an inner liner spaced from the outer wrapper and including a plurality of joined walls and an inner liner edge; and a trim breaker comprising: a body including a rear wall, a first leg extending from the rear wall and coupled with the outer wrapper edge, and a second leg extending from the rear wall and coupled with the inner liner edge; and a front wall coupled with the body opposite the rear wall, wherein the front wall comprises a channel extending inward toward the rear wall; and a chamber defined at least in part between the front wall and the rear wall; and wherein the trim breaker seals the outer wrapper with the inner liner to form an insulation space between the outer wrapper and the inner liner.

According to a ninth aspect of the present disclosure, the appliance of the eighth aspect, wherein the body and the front wall comprise a polymeric material.

According to a tenth aspect of the present disclosure, the appliance of the eighth aspect, wherein a length of the second leg is greater than a length of the first leg, as measured from the front wall to a distal end of each leg.

According to an eleventh aspect of the present disclosure, the appliance of the eighth aspect, wherein the front wall is coupled with the body by a snap-fit, an interference fit, an adhesive, a weld, or combinations thereof.

According to a twelfth aspect of the present disclosure, the appliance of the eighth aspect, wherein the front wall includes a recess configured to receive a metal component therein, and wherein the metal component is disposed in the front wall between the channel and the second leg.

According to a thirteenth aspect of the present disclosure, the appliance of the eighth aspect, wherein the outer wrapper and the inner liner comprise a metal or metal alloy.

According to a fourteenth aspect of the present disclosure, the appliance of the eighth aspect, further comprising: a door comprising a first gasket configured to form a seal with the front wall when the door is in a closed position and a second gasket disposed adjacent to the first gasket such that the second gasket is between the first gasket and an interior of the appliance when the door is in the closed position.

According to a fifteenth aspect of the present disclosure, the appliance of the fourteenth aspect, wherein the door further comprises a rib disposed adjacent to the second gasket such that the rib is between the second gasket and the interior of the appliance when the door is in the closed position.

According to a sixteenth aspect of the present disclosure, a trim breaker for sealing an outer wrapper of an appliance with an inner liner to form an insulation space therebetween includes: a body including a rear wall, a first leg extending from the rear wall, and a second leg extending from the rear wall; a front wall coupled with the body opposite the rear wall, wherein the front wall comprises a channel extending inward toward the rear wall; and a chamber defined at least in part between the front wall and the rear wall.

According to a seventeenth aspect of the present disclosure, the trim breaker of the sixteenth aspect, wherein the body and the front wall comprise a polymeric material.

According to an eighteenth aspect of the present disclosure, the trim breaker of the sixteenth aspect, wherein a length of the second leg is greater than a length of the first leg, as measured from the front wall to a distal end of each leg.

According to a nineteenth aspect of the present disclosure, the trim breaker of the sixteenth aspect, wherein the rear wall includes a first portion connected with a second portion that is offset toward the front wall relative to the first portion.

According to a twentieth aspect of the present disclosure, the trim breaker of the sixteenth aspect, wherein the front wall includes a metal component disposed between the between the channel and the second leg.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A trim breaker for an appliance cabinet, the trim breaker comprising:
    a body including a rear wall, a first leg of the body extending from the rear wall and configured to receive an edge of an outer cabinet wrapper, and a second leg of the body extending from the rear wall and configured to receive an edge of an inner cabinet liner;
    a front wall attached to the first and second legs of the body opposite the rear wall; and
    an enclosed chamber defined between the front wall, the rear wall, the first leg and the second leg, wherein the front wall includes a U-shaped channel extending inward from a front surface and toward the rear wall, the U-shaped channel extending a majority of a depth of the enclosed chamber, wherein the front wall includes a recess configured to receive a metal component therein, wherein the metal component is disposed in the front wall between the U-shaped channel and the second leg.

2. The trim breaker of claim 1, wherein the body and the front wall comprise a polymeric material.

3. The trim breaker of claim 1, wherein a length of the second leg is greater than a length of the first leg, as measured from the front wall to a distal end of each leg.

4. The trim breaker of claim 1, wherein the rear wall includes a first portion connected with a second portion, wherein the second portion is offset toward the front wall relative to the first portion.

5. The trim breaker of claim 4, wherein the U-shaped channel extends beyond the second portion of the rear wall.

6. The trim breaker of claim 1, wherein the rear wall, the first leg and the second leg are integrally formed as a single piece, and wherein the front wall is attached to the first leg and the second leg to form the enclosed chamber.

7. The trim breaker of claim 1, wherein the U-shaped channel defines a slot within the front surface of the front wall.

8. A trim breaker for an appliance cabinet, the trim breaker comprising:
    a body including a rear wall, a first leg of the body extending from the rear wall and configured to couple with an outer wrapper edge, and a second leg of the body extending from the rear wall and configured to couple with an inner liner edge; and
    a front wall coupled with the first and second legs of the body opposite the rear wall to define an enclosed chamber therein, wherein a front surface of the front wall defines a U-shaped channel extending inward through toward the rear wall, wherein the front wall includes a recess configured to receive a metal component therein, and wherein the metal component is disposed in the front wall between the U-shaped channel and the second leg, wherein a length of the second leg is greater than a length of the first leg, as measured from the front wall to a distal end of each leg.

9. The trim breaker of claim 8, wherein the body and the front wall comprise a polymeric material.

10. The trim breaker of claim 8, wherein the front wall is coupled with the body by a snap-fit engagement.

11. The trim breaker of claim 8, wherein the rear wall includes a first portion connected with a second portion, wherein the second portion is offset toward the front wall relative to the first portion.

12. The trim breaker of claim 11, wherein the U-shaped channel extends beyond the second portion of the rear wall.

13. The trim breaker of claim 8, wherein the U-shaped channel defines a slot within the front surface of the front wall.

14. A trim breaker for an appliance cabinet, the trim breaker comprising:
    a body including a rear wall, a first leg of the body extending from the rear wall, and a second leg of the body extending from the rear wall; and
    a front wall attached to the first leg and the second leg of the body opposite the rear wall to define an enclosed chamber therein, wherein the front wall defines a U-shaped channel extending inward toward the rear wall, wherein the rear wall includes a first portion connected with a second portion that is offset toward the front wall relative to the first portion, wherein the U-shaped channel extends toward the first portion of the rear wall and extends beyond the second portion of the rear wall.

15. The trim breaker of claim 14, wherein the body and the front wall comprise a polymeric material.

16. The trim breaker of claim 14, wherein a length of the second leg is greater than a length of the first leg, as measured from the front wall to a distal end of each leg.

17. The trim breaker of claim 14, wherein the front wall includes a metal component disposed between the between the U-shaped channel and the second leg of the body.

18. The trim breaker of claim 17, wherein the metal component is integrally formed with the front wall.

\* \* \* \* \*